March 21, 1967  R. B. JOHNSON  3,310,251
REEL DRIVE MECHANISM
Filed May 14, 1964  2 Sheets-Sheet 1

ROBERT B. JOHNSON
INVENTOR.

BY
ATTORNEYS

United States Patent Office 3,310,251
Patented Mar. 21, 1967

3,310,251
REEL DRIVE MECHANISM
Robert B. Johnson, Rochester, N.Y., assignor to Eastman Kodak Company, Rochester, N.Y., a corporation of New Jersey
Filed May 14, 1964, Ser. No. 367,355
7 Claims. (Cl. 242—55.14)

The present invention pertains to a drive mechanism and more particularly to an improved arrangement for handling long strips of material such as films, wires, threads or ribbon useful in storing and reproducing signal information. Materials answering this description will be generally referred to hereinafter as films.

More specifically, the invention pertains to apparatus for moving films which are normally stored on reels, spools and like. Many prior art devices have been developed for tensioning or driving supply and take-up reels usable with tape recorders, and film projectors. One of the preferred methods of operation is by tensioning of both reels during the entire utilization or rewinding of the film driven between the reels. By tensioning of both reels, I refer to the applying of tension to the reels so that tension is maintained in the film during the processing or utilization thereof. On the other hand, allowing the film to become slack or to unwind appreciably from either of the reels involved in its conveyance is likely to result in damage or destruction to the film.

One prior art arrangement for applying tension to both supply and take-up reels of a film utilizes magnetic unidirectional clutches with varying magnetic force being developed in accordance with the amount of film material wound on the spool or reel. Such an arrangement is particularly useful for maintaining a uniform tension. However, it requires means for detecting the amount of material on the spool with this detecting means being arranged to regulate the effectiveness of the magnetic clutch. Generally, with such a detector it is requisite to detect the film surface directly. Thus, a feeler is provided to engage the outer surface of the film being wound from or onto the reels so that the diameter of film on the reel may be determined continuously. Such direct contact either requires the development of a very small and smooth roller contact which is relatively expensive or requires a sliding contact on the film, both of which tend to abrade the film substantially more than is necessary simply because of the utilization of the film in an information recording or retrieval mechanism. Because of this additional wear, among other things, such constant tension film projectors have not been fully accepted.

Therefore, an object of the present invention is to provide an improved and simplified clutch mechanism usable in a constant tension film drive arrangement.

One embodiment of the present invention utilizes a pair of reels driven from a unidirectional motor by a pair of slipping clutches so that both tend to wind a film thereon continuously. The tension developed in the film by each of the clutches is of the order of one ounce with the torque of the clutches varying in accordance with the convolution growth or shrinkage of the film on each reel to provide such a tension. This convolution change is predictably related to the mass of the film material on the reel whereby the weight of the reel and the film thereon is utilized to deflect the clutch to provide a friction drive thereof. This change of mass provides a changing, twisting force on a spindle supporting the reel. The spindle itself is supported by a flanged hub in a toroidal opening of a driving cup. Thus, the hub frictionally engages the inner surfaces of the toroidal opening in accordance with the mass of the reel and the film tending to twist the spindle. The one ounce tension selected in the film itself is designed to be substantially less than the driving force of a utilization portion of the film wherein signal information is recorded thereon or retrieved therefrom. In the case of a "movie" projector the priving portion of the utilization device includes a claw which advances the film one frame at a time.

The subject matter which is regarded as my invention is particularly pointed out and distinctly claimed in the concluding portion of this specification. The invention, however, as to its organization and operation, together with further objects and advantages thereof, will best be understood by reference to the following description taken in connection with the accompanying drawings, in which:

Figure 1:
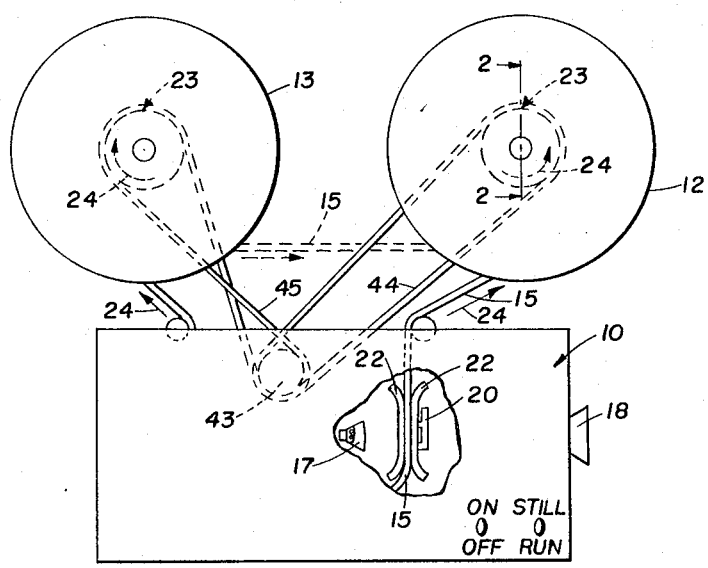
FIG. 1 is a schematic elevation view of a projector utilizing my invention.

Referring now to the drawings wherein like numbers refer to similar parts, I have shown in FIG. 1 a projector 10 arranged to support a supply reel 12 and a take-up reel 13. Between the reels 12 and 13 is threaded a film 15 which may be driven through the projector 10 during a picture viewing sequence. Also the film may be coupled directly between the reels during rewind as indicated in dashed lines. Both of these operations are well known to home movie viewers. By analogy, the projector 10 could be a magnetic tape recorder or tape player. The projector itself includes an illuminating lamp 17 and a lens system 18 with the film driven therebetween by a claw or driving finger 20 in the region of a containing film gate 22 which holds the film in flat focal alignment with the lens system 18. Also provided are shutter mechanisms etc. (not shown) of conventional arrangements so that the film 15 is only viewed during moments when it is residing in a fixed position.

Each of the reels 12 and 13 is driven by a clutch 23 (FIG. 2) so that it is continually maintaining a tension in the film 15 as indicated by arrows 24. In one particular embodiment of my invention this tension is arranged to be approximately one ounce so that the claw 20 may move the film easily and so that the framing film gate 22 may easily maintain the film in a stopped position between operations of the claw 20.

Figure 2:
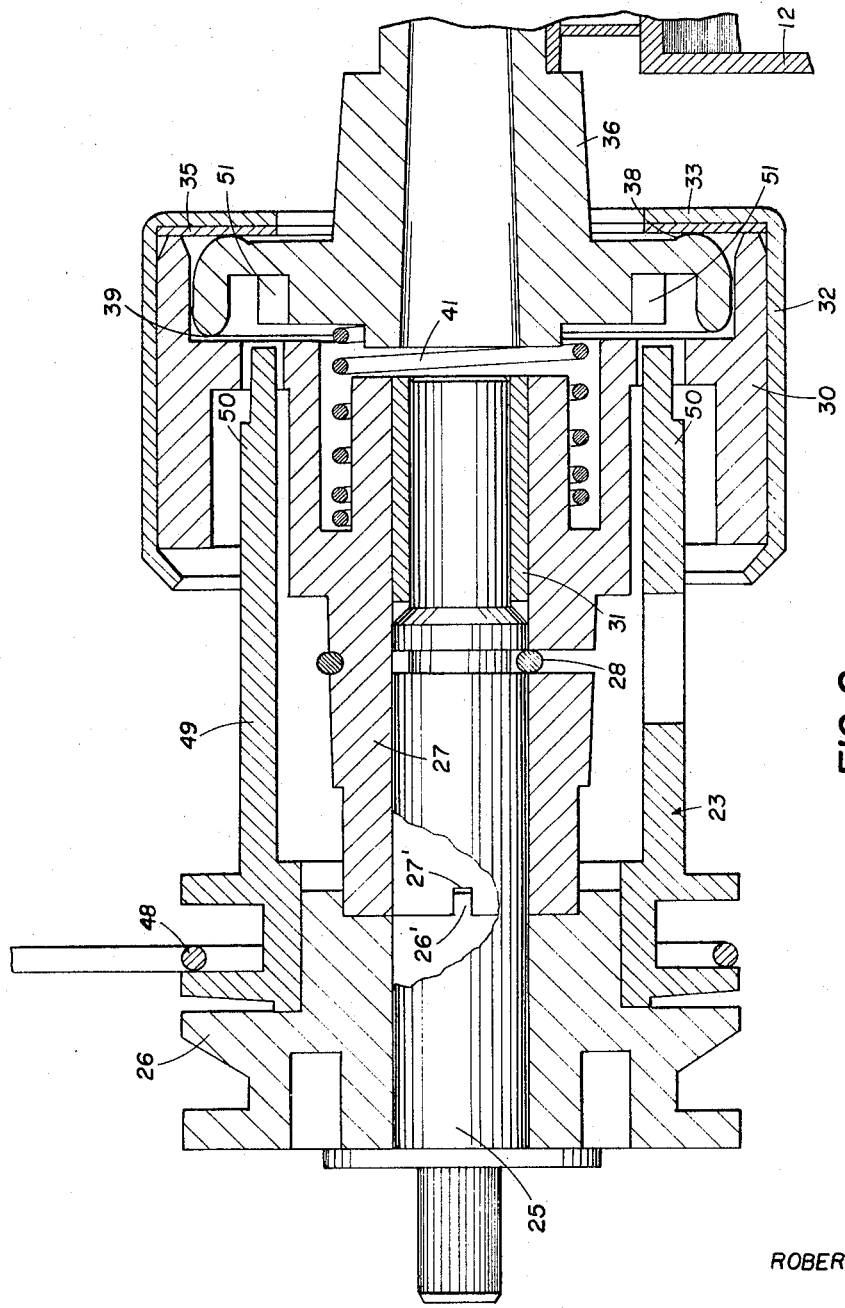
FIG. 2 is a cross-section view of the slipping clutch mechanism itself taken along the line 2—2 of FIG. 1.

As shown more clearly in FIG. 2, the clutch mechanism 23 comprises a solid support shaft 25 on which is secured a drive pulley 26 and a driving cup 27. I prefer that the cup 27 be fabricated of a stable material such as a filled plastic with drive slots 27' each engaged by a key 26' of the pulley 26. The cup 27 and the drive pulley 26 are rotatably secured to the shaft by conventional means such as a snap fastener 28. I prefer that the cup 27 be secured to a metal bearing 31 which rotates on the shaft 25.

The driving cup 27 is provided with an outer flange 30 upon which is affixed a metal retainer cup 32 having an inwardly depending annular surface 33. Secured within the surface 33 against the flange 30 is a low-frictional nylon washer 35. Within the toroidal compartment formed by the washer 35, the annular flange 30 and the cup 27 is the hub of a filled plastic spindle 36.

On the shaft of the spindle 36 is mounted one of the reels 12 (or 13). Since the clutch member 23 is mounted horizontally as illustrated in FIG. 2, any weight including that of the reel 12 placed on the end of the spindle 36 will slightly deflect or twist the hub of the spindle 36 so that a portion of an outer surface 38 thereof engages the washer 35 and a lower portion of an inner surface 39 thereof engages the cup 27 directly as does the lower tangential surface. The surface 38 extends beyond adjacent surfaces of the hub so that engagement of the washer 35 is only near the outer extremity of the hub. Such construction limits the torsional forces to a predetermined radius and thereby to a predictable magnitude. The engagement of the surfaces 38 and 39 causes the torsional drive of the shaft 25 to be transmitted from the cup 27 to the reel 12 in accordance with the mass of the reel and film on the spindle 36. Obviously, variation of the leverage distance between the reel 12 and the support of the hub 36 will provide another regulation of the driving force.

In order that reels of light weight may be used, I have added a spring member 41 which tends to force the outer surface 38 of the spindle 36 toward the washer 35. One spring that works satisfactorily develops about a three ounce thrust. However, the clutch of the reel 13 does not usually require such a spring 41 particularly when the take-up reel is a relatively heavy 400' metal reel. The supply reel 12 may be a 50' plastic reel, a type often used for spooling film at processing stations.

Driving of the shaft 25 and the pulley 26 is in a relatively conventional manner. As illustrated in FIG. 1, a motor 43 drives the drive pulleys 26 by means of belts or spring cables 44 and 45. The direction of the rotation of the drive pulley of the motor 43 is selected to be counterclockwise as indicated, so that the drive wheel 12 tends to rotate in a counterclockwise direction to thereby maintain the tension indicated by the arrow 24 in the film 15. On the other hand, the belt 45 is twisted once so that the take-up reel 13 tends to rotate in a clockwise direction to thereby similarly maintain the tension indicated by the arrow 24 in the film 15.

So long as the film 15 is being driven through the utilization device (10) this tension is maintained. During rewind, the film 15 is fastened to the core of the supply reel 12. A lever 48 is driven to the right as indicated in FIG. 2 to cause a drive clutch 49 to have its tines 50 directly engage mating slots 51 in the hub of the spindle 36. In practice, this direct drive may be accomplished either before or after rewind has commenced. Thus, rewind is accomplished at the speed of the drive pulley 26 and tension is maintained in the tape by the driven clutch of the reel 13.

While I have shown and described a particular embodiment of the present invention, other modifications will occur to those skilled in this art. For instance, although particular plastics are mentioned above, other materials will operate satisfactorily with my invention. I intend by the appended claims to cover such modifications as properly fall within the true spirit and scope of my invention.

I claim:
1. A driving mechanism for driving a film reel having a variable mass dependent on the amount of film wound thereon to maintain a constant tension in a film connected to the reel, comprising:
   a rotatable driver housing having a pair of spaced driving surfaces therein;
   a spindle for supporting the reel in a plane wherein the mass of the reel establishes a moment arm on said spindle; and
   a flange on said spindle positioned in said housing to support said spindle on said housing, said flange being positioned between said surfaces to be frictionally engaged by at least one of said surfaces, the moment arm on said spindle tending to tilt said flange toward engagement with both of said surfaces to establish a force of frictional engagement related to the mass of the reel.

2. A driving mechanism as claimed in claim 1 further including a spring mounted in compression between said housing and said spindle to bias said flange into engagement with one of said surfaces to provide a minimum force of frictional engagement when the mass of the reel is less than a predetermined magnitude.

3. A drive mechanism as claimed in claim 1 further including tines selectively positionable to couple said housing to said spindle to provide a positive driving coupling therebetween.

4. A driving mechanism for driving a film reel having a variable mass dependent on the amount of film wound thereon to maintain a constant tension in a film connected to the reel, comprising:
   a rotatable driver cup having a pair of spaced annular driving surfaces positioned in substantially parallel planes and defining a toroidal space within said cup;
   means for rotating said cup;
   a spindle for supporting the reel in a plane wherein the mass of the reel establishes a moment arm on said spindle;
   a flared portion on said spindle positioned in said toroidal space of said cup to support said spindle on said cup, said flared portion being positioned between said surfaces to be selectively engaged by one or both of said surfaces, the moment arm on said spindle tending to tilt said flared portion toward engagement with both of said surfaces to establish a force of frictional engagement related to the mass of the reel; and
   means for biasing said flared portion toward engagement with one of said surfaces.

5. A drive mechanism as claimed in claim 4 wherein said driving cup comprises:
   a retaining cup having an end wall defining one of said driving surfaces; and
   an annular member positioned within said retaining cup having a surface extending radially inward defining the other of said driving surfaces, the spacing between said driving surfaces being slightly greater than the interposed thickness of said flared portion.

6. A drive mechanism as claimed in claim 5 further including a low friction plastic washer positioned between said end wall of said retaining cup and said flared portion of said spindle.

7. A drive mechanism as claimed in claim 5 wherein said flared portion is provided with annular surfaces of predetermined diameter near the outer extremity thereof which are engaged by said driving surfaces.

References Cited by the Examiner
UNITED STATES PATENTS
2,343,961   3/1944   Del Valle _____ 242—55.14

FRANK J. COHEN, *Primary Examiner.*

L. D. CHRISTIAN, *Assistant Examiner.*